(12) United States Patent
Classon et al.

(10) Patent No.: US 7,126,996 B2
(45) Date of Patent: Oct. 24, 2006

(54) ADAPTIVE TRANSMISSION METHOD

(75) Inventors: Brian K. Classon, Palatine, IL (US);
Philippe J. Sartori, Algonquin, IL (US); Vijay Nangia, Schaumburg, IL (US); Xiangyang Zhuang, Hoffman Estates, IL (US); Kevin L. Baum, Rolling Meadows, IL (US)

(73) Assignee: Motorola, Inc., Schaumburg, IL (US)

( * ) Notice: Subject to any disclaimer, the term of this patent is extended or adjusted under 35 U.S.C. 154(b) by 438 days.

(21) Appl. No.: 10/035,039

(22) Filed: Dec. 28, 2001

(65) Prior Publication Data

US 2003/0123559 A1 Jul. 3, 2003

(51) Int. Cl.
*H04L 27/28* (2006.01)

(52) U.S. Cl. ...................................... 375/260; 370/332

(58) Field of Classification Search ................ 375/260, 375/264, 267, 285; 455/504, 506, 522, 67.13, 455/62, 63.1; 370/208, 252, 332, 333, 343, 370/468, 230, 235, 335, 206, 329
See application file for complete search history.

(56) References Cited

U.S. PATENT DOCUMENTS

| | | | |
|---|---|---|---|
| 5,983,101 A * | 11/1999 | Billstrom | 455/452.2 |
| 5,991,618 A * | 11/1999 | Hall | 455/425 |
| 6,130,881 A | 10/2000 | Stiller et al. | |
| 6,289,217 B1 * | 9/2001 | Hamalainen et al. | 455/425 |
| 6,304,556 B1 | 10/2001 | Haas | |
| 6,456,599 B1 | 9/2002 | Elliott | |
| 6,795,424 B1 * | 9/2004 | Kapoor et al. | 370/343 |
| 2002/0006167 A1 * | 1/2002 | McFarland | 375/260 |
| 2003/0086371 A1 * | 5/2003 | Walton et al. | 370/235 |

OTHER PUBLICATIONS

R. Knop, "Information Capacity and Power Control in Single-Cell Multiuser Communications," IEEE p. 331-335 (1995).
Andreas Czylwik, "Adaptive OFDM for Wideband Radio Channels," IEEE p. 713-718 (1996).
Amitava Ghosh et al., "Performance of Coded Higher Order Modulation and Hybrid ARQ for Next Generation Cellular CDMA Systems," IEEE p. 500-505 (2000).
Paul Bender et al., "CDMA/HDR: A Bandwidth-Efficient High Speed Wireless Data Service for Nomadic Users," IEEE, p. 70-77 (2000).
"IxEV-DV Evaluation Methodology (Rev. 26)," WG5 Evaluation AHG, p. 1-87 (2001).
Robert Love et al., "High Speed Downlink Packet Access Performance" IEEE p. 2234-2238, (2001).
Mickael D. Batariere et al., "An Experimental OFDM System for Broadband Mobile Communications," IEEE p. 1947-1951 (2001).
Amitava Ghosh et al., "Air-Interface for 1XTREME/1xEV-DV," IEEE p. 2474-2478 (2001).

* cited by examiner

Primary Examiner—Khanh Tran (57) ABSTRACT

Mobile units in a multicarrier, multidimensional communications system can assess their own channel coherence time attributes (base stations can also access such dynamics for mobile units as well). This information is utilized (either by the mobile unit itself or by an infrastructure component such as a base site) to determine a level of trustworthiness for other channel quality data as might be measured by the mobile unit. Different modulation and coding schemes, along with responsive frequency and time diversity resource allocations, are adaptively selected as a function of this level of trustworthiness.

49 Claims, 7 Drawing Sheets

ADAPTIVE TRANSMISSION METHOD

TECHNICAL FIELD

This invention relates generally to wireless communications and more particularly to multicarrier, multidimensional systems.

BACKGROUND

Wireless communications systems of various kinds are well understood in the art. Some systems utilize frequency diversity to facilitate such communications. Multicarrier communication, such as orthogonal frequency division multiplexing (OFDM) is a particular way to support high data rate broadband systems that operate in a multipath environment. Generally, a multicarrier system can transmit on multiple carriers, and each of these carriers may also be referred to as a subcarrier. The OFDM approach divides a radio frequency channel into several narrower bandwidth subcarriers and transmits data simultaneously on each subcarrier.

Mobile reception over multipath channels is known to create variations in signal quality in both the time and frequency dimensions. For example, the root mean squared delay spread of the multipath channel strongly influences the coherence bandwidth of the channel, and the maximum Doppler spread (which is related to the mobile velocity) strongly influences the coherence time of the channel. Therefore, in a multicarrier communication system such as OFDM, the signal quality generally varies in two dimensions: time and frequency. Variation in frequency implies that different subcarriers may experience different signal qualities at the same time. Variation in time means that a particular subcarrier may experience different signal qualities at different times. The amount of change in signal quality between adjacent subcarriers is characterized by the subcarrier frequency spacing and the delay spread characteristics of the channel, while the amount of change in signal quality between adjacent OFDM symbol intervals is characterized by the OFDM symbol duration and the Doppler spread of the channel.

Multipath reception conditions are known to impact reception accuracy. Generally speaking, the more intense the multipath effect, the worse the reception conditions (though since this effect is frequency dependent, not all subcarriers of a multicarrier system are similarly affected). The multipath effect can result from a variety of causes. It is also known that with a moving context (i.e., when the transmitter, reception target, and/or target's environment is moving), the multipath effect can change very quickly. Hence, it becomes increasingly difficult with increasing speed of the target to have both the transmitting radio and the receiving target getting a reliable estimate of the instantaneous channel response. Also, at a given instant, the multipath effect can be very intense, resulting in a very complex channel frequency response.

Figure 1:
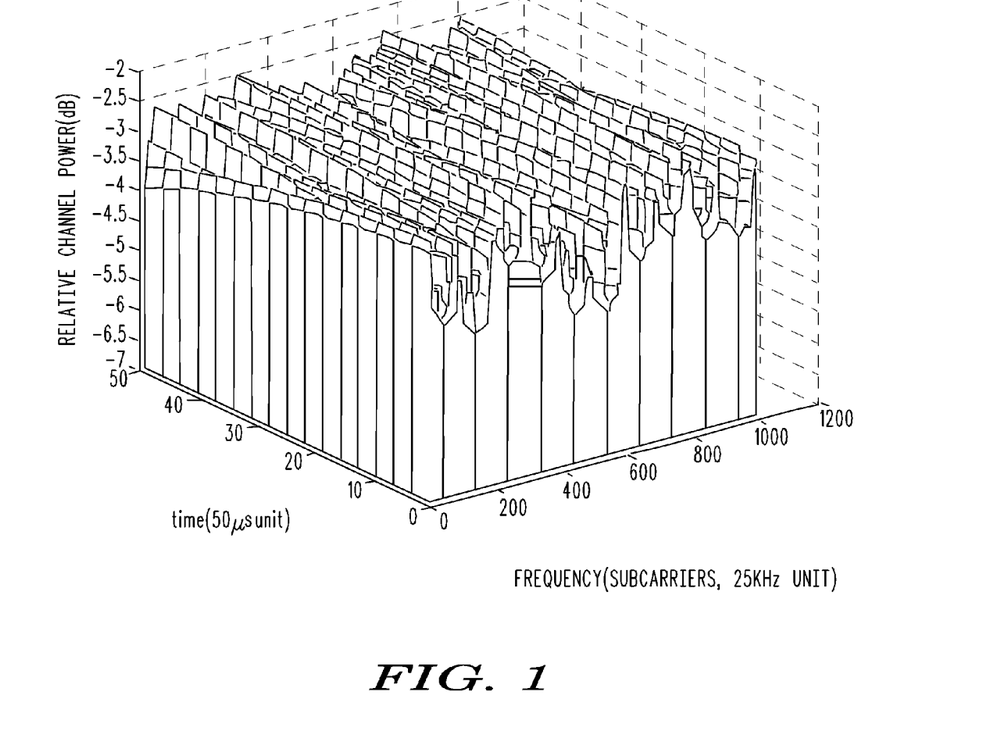
FIG. 1 comprises a power gain of the channel versus time versus frequency graph for a multicarrier communications system as pertains to a transmission target traveling at 27 kilometers per hour.
Figure 2:
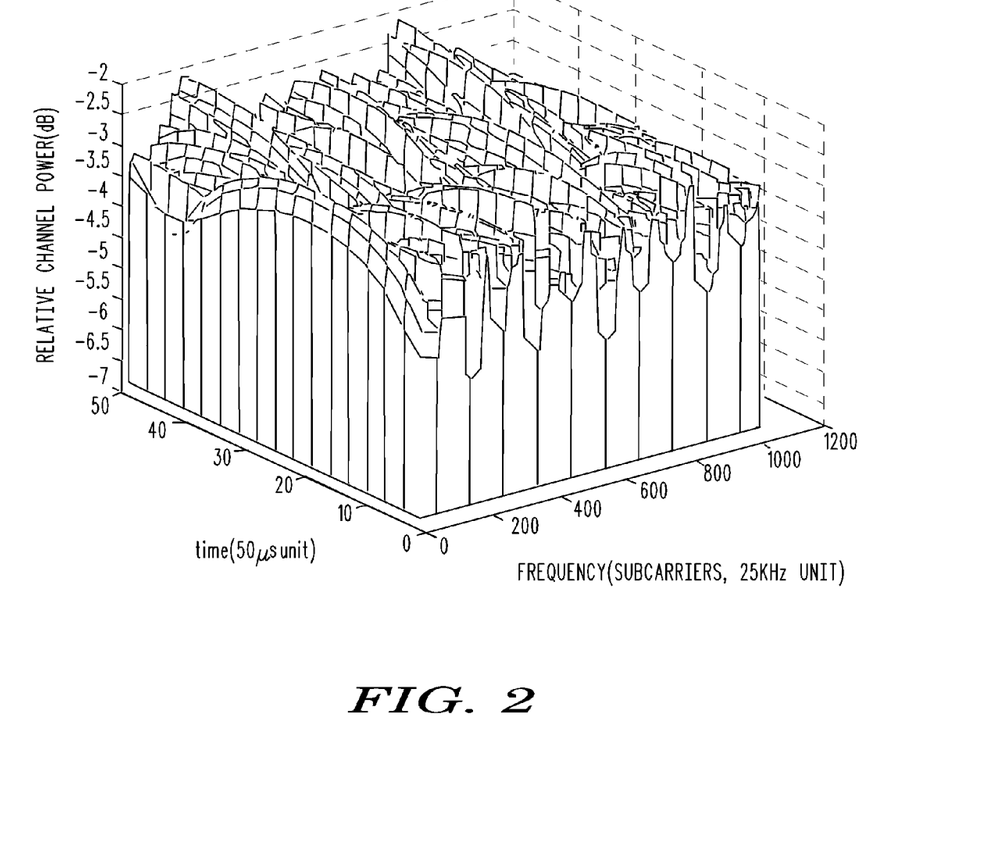
FIG. 2 comprises a power gain of the channel versus time versus frequency graph for a multicarrier communications system as pertains to a transmission target traveling at 81 kilometers per hour.
Figure 3:
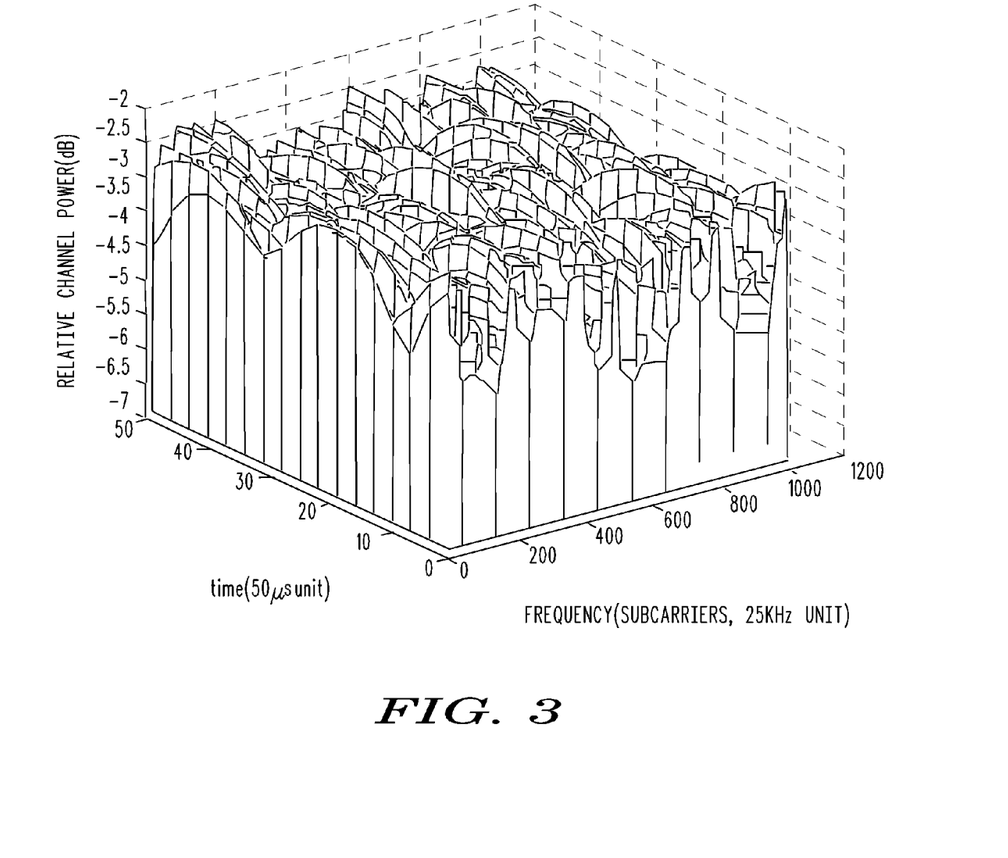
FIG. 3 comprises a power gain of the channel versus time versus frequency graph for a multicarrier communications system as pertains to a transmission target traveling at 135 kilometers per hour.

To illustrate these points, consider the power versus time versus frequency graph presented in FIG. 1 (this figure depicts these parameters in a relative sense as between subcarriers and not as an absolute channel response; in terms of delay profile, it represents a "bad urban" channel with two clusters, each having a root mean squared delay spread of 1.2 μs). This data represents received power over time and over a number of subcarrier frequencies for a receiver moving at 27 kilometers per hour. Though signal perturbations in time do occur, for any given frequency these perturbations are relatively slow to occur. Referring now to FIG. 2, a similar graph is presented depicting data generated for a vehicle moving at 81 kilometers per hour. The perturbations in time are seen to occur more frequently. Similarly, and referring now to FIG. 3, the perturbations in time occur with even greater frequency for a vehicle moving at 135 kilometers per hour. In general, the rate of change of the channel power as a function of frequency is not significantly different with respect to the velocity because all of the examples have the same root mean square delay spread. If, however, the delay spread of the channel was increased, a corresponding increase in the rate of channel perturbations would be observed in the frequency dimension.

As noted, orthogonal frequency division multiplexing is a particularly apt choice for systems that must support communications in a harsh wireless communications environment. Consequently this approach finds use in, for example, cellular telephony systems. Generally, such a system is designed to accommodate mobile users in vehicles that are potentially moving at significant speed with respect to the transmission source. Some studies indicate, however, that in such a system, in fact a majority of the users at any given moment are not moving at a significant speed, especially in an urban environment. As a result, communications in support of a majority of the users will generally not experience a fast-varying channel in the time domain. This means that the overall system, optimized as it is to facilitate robust performance in a harsh environment for individual users, will actually exhibit an overall impairment of data system throughput when viewed with respect to all users because the system must accommodate some users in particularly difficult reception circumstances.

Adaptive modulation and coding schemes (where different modulation and/or coding schemes are selected to accommodate different situations) are also known and utilized to at least attempt to optimize data throughput as between a transmission source and a transmission target. Such techniques have found use in the time dimension of wireless communications systems (for example, with code division multiple access systems or with time division multiple access systems). Unfortunately, use of such techniques in the time dimension lack the frequency domain aspects of orthogonal frequency division multiplexing. Consequently, such techniques may not be optimal for orthogonal frequency division multiplexing. (For example, using the same modulation on all subcarriers and adapting the modulation occasionally in the time dimension ignores the variability of the channel quality in the frequency dimension.)

Adaptive modulation and coding techniques have also been applied to the frequency dimension, for example, in Asymmetrical Digital Subscriber Line (ADSL) systems. However, the adaptive modulation and coding approach typically used in ADSL systems is only updated in time relatively infrequently because the channel between the transmission source and the transmission target remains almost constant over time (and also in part because of the considerable overhead that the technique imposes upon the system). Such a slowly adapting technique is not always applicable in a wireless cellular environment where the channel can change rapidly over time and frequency.

A need therefore exists for a way to improve upon overall system data throughput for a multicarrier communications systems such as a wireless orthogonal frequency division multiplexed communications system. Preferably any such improvement should not present a significant or undue loading requirement upon the system itself. Also, such a solution should not unduly delay the transmission of data in favor of overall improvement throughput. Further, any such improvement should be efficient in operation, relatively inexpensive, and effective.

BRIEF DESCRIPTION OF THE DRAWINGS

These needs and others are substantially met through provision of the adaptive transmission method described herein. These benefits and others will become more clear upon making a thorough review and study of the following detailed description, particularly when studied in conjunction with the drawings, wherein.

DETAILED DESCRIPTION

These embodiments generally pertain to a method to facilitate adaptive transmissions in a multicarrier, multidimensional domain. Upon receiving data to be transmitted to at least one transmission target, a transmission source determines whether trustworthy channel quality data can likely be obtained. In this context, trustworthiness can relate both to the relative likely accuracy of the data as of a time of ascertaining the data as well as the temporal currency and valid applicability of the data at a later time of use and application, but especially the latter concept can be important. If trustworthy quality data cannot likely be obtained (for example, if the transmission target is moving at a high rate of speed and thereby experiencing fast channel rate variations such that channel quality data reflecting channel quality at some period in time will likely be stale and inaccurate when used at a later time) a first transmission selection mode can be utilized. This first transmission selection mode can vary with the application and can include a single modulation and coding scheme or an adaptive modulation and coding scheme. When trustworthy quality data is likely obtainable (as when the transmission target is stationary or only moving at a slower rate of speed), however, a second transmission selection mode can be utilized. Although this second transmission selection mode can share some or all of the same modulation and coding schemes as the first transmission selection mode, improved performance will typically accompany providing an adaptive modulation and coding scheme that can leverage and take advantage of a less harsh reception environment (such as, for example, a fast selective modulation and coding scheme).

The expression "adaptive modulation and coding" as used herein refers generally to adaptive modulation, adaptive coding, or a combination thereof. Adaptive modulation techniques are well known (such as, for example, "variable MQAM systems"). Adapting the coding is also known in the art. For example, a code can be punctured to change the code rate. Additional examples of possible adaptive coding techniques include, but are not limited to, using different codes with the same rate, different codes with different rates, or rate matching methods (which typically use a combination of repeating and puncturing). As is known in the art, adaptive modulation and adaptive coding may also be combined. A specific combination of a modulation constellation and a channel coding scheme (with no coding a possible coding scheme) is referred as a modulation and coding scheme.

Adaptive modulation and coding can be performed in the time dimension. (When the modulation and coding scheme choices are selected for a time interval smaller than the channel coherence time, the method may be referred to as fast adaptive modulation and coding. When the modulation and coding scheme selection is selected for a time interval larger than the channel coherence time, the method may be referred as slow adaptive modulation and coding.) Similarly, for multicarrier systems, adaptive modulation and coding can be performed in the frequency dimension. (When the modulation and coding schemes are selected in such a way that each individual modulation and coding scheme is chosen on a subband smaller than the channel coherence bandwidth, the process may be referred to as selective adaptive modulation and coding. When the modulation and coding schemes are selected in such a way that each individual modulation and coding scheme is chosen on a subband larger than the channel coherence bandwidth, the process may be referred as non-selective adaptive modulation and coding.)

When configured in accordance with the present invention, a multicarrier communications system can respond in significant ways to adapt to varying conditions that impact the ability of the system to ascertain channel quality at any particular moment in time. This allows the system to support both robust communications in a harsh environment as well as improved data throughput in improved conditions. If fast selective adaptive modulation and coding is performed, multiple users each experiencing differing multipath conditions can be supported in a way that significantly improves overall system throughput.

Figure 4:
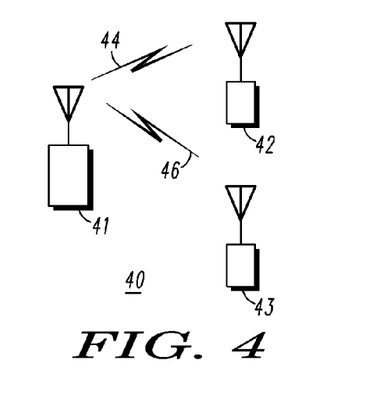
FIG. 4 comprises a block diagram depiction of a wireless communications system.

Referring now to FIG. 4, an illustrative multicarrier communications system 40 includes a base site 41 and two receiving platforms 42 and 43. These elements support communications pursuant to an orthogonal frequency division multiplexing scheme.

Consequently, communications 44 from the base site 41 to the first receiving platform 42 are conveyed through a multicarrier channel (in this specific embodiment a channel consisting of a set of orthogonal subcarriers). As will be detailed below, such a communications 44 can be broadband across a plurality of subcarriers or subbands, or narrowband across fewer (or only one) subcarriers or subbands. Further, such communications 44 can also be diversified with respect to time as well. Similarly, communications 46 from the base site 41 to the second receiving platform 43 can also be supported by the multicarrier, multidimensional channel in a variety of ways. As will be shown below, transmissions such as these can be adapted in a variety of ways to accommodate the quality of the channel as between the base site 41 and any given receiving platform as well as the ability to obtain trustworthy information regarding such quality within a relevant time frame.

Figure 5:
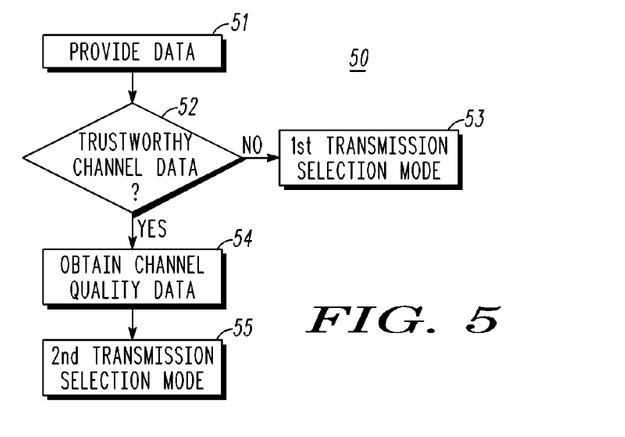
FIG. 5 comprises a general flow diagram configured in accordance with various embodiments of the invention.

Referring now to FIG. 5, various processes for facilitating such an activity will be described.

To begin, one or more data sources provide 51 data to the base site to be transmitted to a particular one or more transmission targets. For purposes of these embodiments, such data can comprise any useful information including voice, textual information, graphic information, telemetry data of various kinds, and so forth. (Of course, such data could also represent a mix of various information types and services.) As suggested, data can be provided for transmission to more than one transmission target. The effectiveness with which certain embodiments described below can accommodate this circumstance constitutes a particular strength of such embodiments.

The base site next determines 52 whether channel quality data as between the base site and the targeted receiving platforms, if otherwise available, are trustworthy. Such channel quality data can be selected as appropriate to a given application. Examples of channel quality data include, but are not limited to, information regarding accuracy of data delivery, information regarding timeliness of data delivery, and so forth. Channel quality indicator data, either as averaged over a plurality of subcarriers or as discretely provided for individual subcarriers, constitutes a specific useful example. To assess whether such data, regardless of availability, would likely be trustworthy, the process can consider data such as information that tends to reflect at least a channel coherence time attribute of the transmission target of interest. (The expression "coherence time" is sometimes used in communications theory to refer to a somewhat specific measure of how fast a channel changes—though this concept is included within the expression "coherence time" as used herein, the expression "coherence time" here further includes a broader concept; a measure or reflection of how much a channel changes from when that channel condition is measured to when such information can be used to effect a particular mode of communication.) For example, information regarding a present velocity of the transmission target, a geographic location of the transmission target (such as would serve to indicate that the transmission target is presently located in an urban area with closely located and numerous tall buildings), or a cruise control setting for a vehicle within which the transmission target is located could all be utilized in this regard. Other indicia could of course be utilized. For example, Doppler power spectrum estimations, maximum Doppler frequency estimations, or time-based comparisons of channel frequency response could serve to generate data of this type. Generally speaking, such information reflects a rate of change of channel characteristics (such as the frequency responses of a channel in a multicarrier system) as experienced by a given transmission target. A higher rate of change generally indicates a reduced coherence time.

In addition to the frequency dimension characteristics of the channel in a multicarrier system, spatial dimension channel characteristics may also be of interest when both the transmitter and receiver are equipped with a plurality of antennas. A multi-antenna setting allows simultaneous transmission of different data streams from the plurality of antennas in the same frequency band, thus increasing the spectral efficiency significantly. The spatial channel characteristics include knowledge of all the spatial channels between each transmit antenna and each receive antenna. In the case of a multicarrier system, each spatial channel comprises multiple subcarriers. Since the channel is now characterized in both frequency and spatial dimensions, as well as in a time dimension (rate of channel variation), this characterizes the wireless system as a multi-dimensional system. Spatial dimension channel characteristics may also be of interest when only the transmitter is equipped with a plurality of antennas. In this case, the spatial channel characteristics can be used to adapt a space-time coding scheme, a transmit diversity scheme, or a handoff scheme.

In one embodiment, the basic information that allows such an assessment to be made as to whether the multidimensional channel quality data is trustworthy can be provided to the base site. For example, each transmission target can transmit to the base site such information as experienced and measured by it. In another embodiment, some or all of the basic information as experienced and measured by the transmission target can be processed at the transmission target to make at least a partial assessment as to the channel coherence time attribute. The conclusion of the transmission target can then be provided to the base site. In applications having relatively symmetrical uplink and downlink resources (such as certain time division duplex systems), the assessment (and even measurements) can be created or refined by observing the uplink traffic from the transmission target at the transmitter (base site). Such measurements can also be refined using various prediction techniques.

A coarse estimation of the Doppler spectrum of a frequency-flat channel is achievable by taking a fast Fourier transform on a block of channel responses observed over time. The maximum Doppler may be estimated from the position of the peak of the Doppler spectrum. Such an operation can be carried out for each subcarrier to get a better estimation of the maximum Doppler frequency. Moreover, the fast Fourier transform operation can be updated adaptively every time a new OFDM symbol is received. This process can be done at the base station in a TDD system. It may also apply to a frequency division duplex system.

Figure 6:
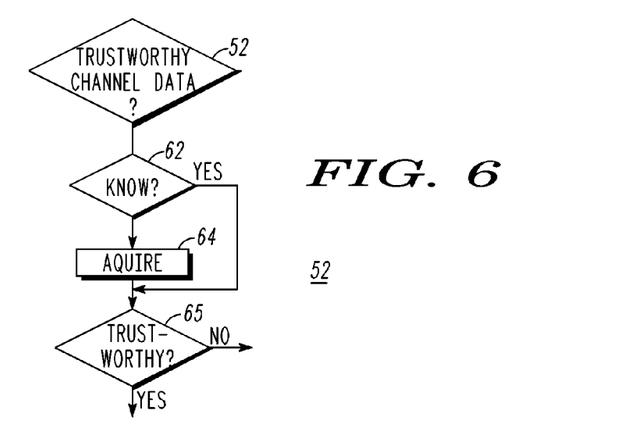
FIG. 6 comprises a detailed flow diagram configured in accordance with various embodiments of the invention.

Referring momentarily to FIG. 6, to make this determination 52, the process can first determine 62 whether the decision supporting information is known. If the information is presently available, a determination 65 as described above can be made as to whether this information supports a conclusion of trustworthiness. When the information is not presently available, the process can acquire 64 the supporting information and then determine trustworthiness 65.

Determining trustworthiness of the channel information can be done in many ways. For instance, one possibility consists in taking two consecutive channel responses and in computing a distance between the two channel responses. The distance can be Euclidean or based on any other appropriate criterion. The distance between the two channel responses may be compared to a pre-determined threshold to determine trustworthiness.

Referring again to FIG. 5, when the above determination 52 indicates that channel quality data, even if available, is unlikely to be trustworthy (for example, because the transmission target is moving at a high rate of speed and hence any channel quality data sensed by the transmission target would only be valid for an unuseful short period of time), a first transmission selection mode 53 is utilized. The first transmission selection mode 53 includes at least one modulation technique and can include additional modulation techniques and/or coding schemes to support greater flexibility if desired. This first transmission selection mode 53 supports communications when trustworthy channel quality data is unlikely to be available such as when a transmission target is moving rapidly. Consequently, a slow adaptive modulation and coding scheme that utilizes a diversity-exploiting strategy by channel coding across the subcarriers and/or time can be effectively utilized. In the alternative, of course, the first transmission selection mode 53 can also include a decision to not transmit all or part of the data as well. In one embodiment, the modulation and coding scheme for slow adaptive modulation and coding can be selected based on the average channel quality, which can include averaging over multiple subcarriers as well as time. In this embodiment, the channel quality is preferably averaged in frequency over all subcarriers and in time over several fades.

When the above determination 52 indicates that channel quality data, if available, will likely be trustworthy (for example, because the transmission target is moving at a lower rate of speed and hence channel quality data sensed by the transmission target would more likely be valid for a useful period of time), the base site will obtain 54 channel quality data as relevant to the transmission target or targets to which data must be transmitted. In one embodiment, such channel quality data can be provided by each transmission target. In an additional embodiment, such channel quality data can be determined by the base site for some or all of the transmission target(s), for example, from the channel quality associated with recent transmissions of the targets.

In one embodiment, the amount of feedback information sent back will depend on the variation of the channel frequency response, with the first mode using only a single value for the band and the second mode using values for at least two groups of subcarriers. In an embodiment featuring a multi-antenna configuration, such feedback is useful for each spatial channel. For the second mode, a possible embodiment to send back the channel quality information is to define a channel quality indicator on a scale taking all the integer values from 0 to the total number of modulation and coding schemes. Also, all the subcarriers can be indexed from 0 to the total number of subcarriers. For each subcarrier index, a channel quality value can be assigned according to the previously defined scale. In one embodiment, the channel quality values are sent sequentially according to their index.

In another embodiment, the total available bandwidth is split into a set of subbands where the channel quality indicator is constant on each of the subbands. The channel quality information is then sent and encoded by selecting one of the subbands, by sending the subcarrier index corresponding to the lower bound of the subband, by sending the subcarrier index corresponding to the upper bound of the subband, by sending the channel quality indicator for the subband, and by repeating this process for all the subbands. If the subbands are sorted in increasing order, the amount of information necessary to encode the channel response can be further reduced by not sending the subcarrier index corresponding to the lower bound of the subband, since it is either 0 for the first subband, or the subcarrier index corresponding to the upper bound of the previous subband increased by one.

Figure 7:
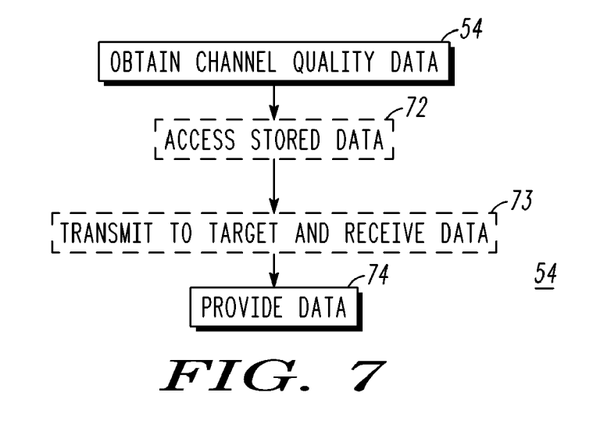
FIG. 7 comprises a detailed flow diagram configured in accordance with various embodiments of the invention.

With momentary reference to FIG. 7, such channel quality information will preferably already be available to the base site in a present temporally trustworthy form (that is, the base site will already have the channel quality data and that channel quality data will not likely be outdated) and therefore can simply be accessed 72 as stored data. (Ways in which such information can be provided to the base site will be described below in more detail.) When such information is not already available, then the base site must actively acquire the information. For example, the base site can transmit 73 a message to the relevant transmission target or targets and request a reply that includes the relevant channel quality information. Regardless of the mechanism, the channel quality data is obtained and provided 74 to guide subsequent decision-making.

A second transmission selection mode 55 follows. Pursuant to this mode, and based at least in part upon the channel quality data, an adaptive modulation and coding scheme is selected for utilization and transmission of data to the corresponding transmission target. Since the second transmission selection mode 55 follows determining that trustworthy channel quality data is attainable, the transmission target is unlikely to be experiencing a rapidly changing reception environment. Therefore, a fast resource allocation algorithm can be utilized to maximize total throughput. For example, a fast selective modulation and coding scheme that can rapidly adapt in response to instantaneous or near instantaneous channel quality indicator information in both the frequency domain (on the orthogonal frequency division multiplexed subcarriers) and the time domain can be put to effective use under these conditions (whereas such an approach would likely be considerably less successful in a fast time-varying operating environment). So configured, the second transmission selection mode 55 can include selecting a particular subcarrier from amongst a plurality of candidate subcarriers, the selection of a plurality of subcarriers from amongst a plurality of candidate subcarriers, selecting a particular modulation technique from amongst a plurality of candidate modulation techniques, and even selecting a first modulation technique for use with a first subcarrier and a second modulation technique for use with a second subcarrier. Even when the same modulation technique is used on different subcarriers, the coding scheme or code rate can be changed as part of the adaptive modulation and coding scheme. Of course, the second transmission selection mode 55 can also include a decision to not transmit all or part of the data as well. A similar fast selective adaptive modulation and coding scheme can be used in the case of multi-antenna systems, including selecting a particular antenna from amongst a plurality of candidate transmit antennas, the selection of a plurality of antennas from amongst a plurality of candidate antennas, and selecting a first modulation and coding technique for use with a first antenna and a second modulation and coding technique for use with a second antenna.

The above described processes can be achieved compatibly with a wide variety of over the air signaling protocols. In one embodiment that uses time division duplexing, and referring now to FIG. 8, a downlink frame 81 as used in conjunction with an uplink frame 82 can well suit the flexibility that accompanies the above approach. (The two frames can be considered part of one frame, such as in a TDD system. The TDD system can also have a flexible boundary between the frames.) The downlink frame 81

Figure 8:
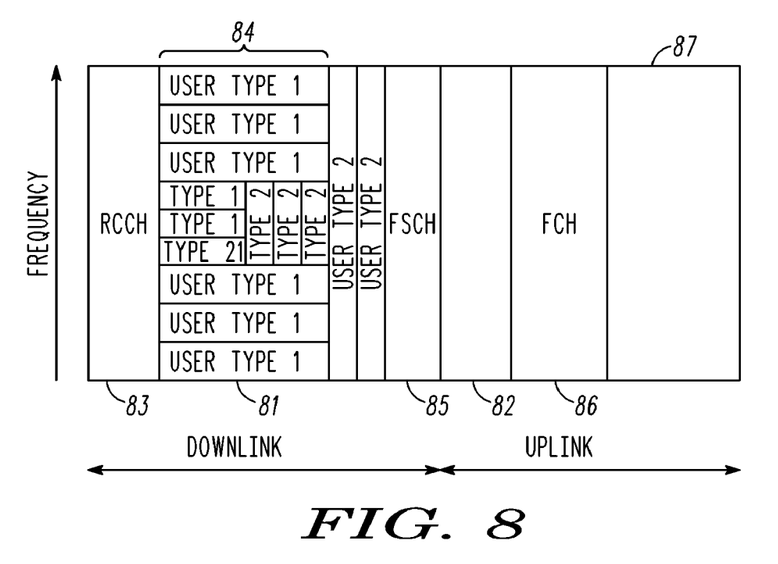
FIG. 8 comprises a block diagram depiction of a downlink and uplink frame as configured in accordance with various embodiments of the invention.

(which facilitates base site to transmission target communications) includes a resource allocation control channel portion 83, a data payload portion 84, and a fast sounding channel 85. The base site utilizes the downlink resource allocation control channel 83 to transmit modulation and coding scheme assignments and time/frequency resource allocation commands for use by the transmission targets during both downlink and uplink transmissions. The downlink fast sounding channel 85 provides a symbol sequence that enables the transmission targets to evaluate the frequency channel response. To better serve this purpose, the fast sounding channel 85 has been positioned at the temporal conclusion of the downlink frame 81. (There are, of course, other ways to serve this same purpose. For example, instead of having a specific temporal location within the frame, the fast sounding channel could be comprised of a logical channel having pilot symbols dispersed throughout the downlink frame 81. Furthermore, this fast sounding channel may not be needed if blind channel estimation techniques are employed.) The fast sounding channel may also be described as a set of pilot symbols that a target can use to estimate the channel response over frequency and/or time. In one embodiment, a target can evaluate a coherence time attribute of the channel based on pilot symbols received at different times (for example, at different times within the downlink frame or different frames) or channel estimates at different times.

The data payload section 84 can be allocated across the subcarriers of the channel (and hence across the frequency domain), across the transmit antennas (and hence across the spatial domain), and also across the time domain. The apportionment depicted serves only as an illustrative example and is meant only to suggest that the data payload section 84 can be allocated in a significant number of ways to suit the data transmission needs, the channel quality circumstances, and the various modulation and coding schemes that might be available in a given application. As depicted, and for purposes of clarity, only two primary transmission schemes are being utilized. The "user type 1" represents transmission targets for which channel quality information is likely trustworthy such that individual subcarriers can be assigned to support specific transmissions. (For example, different subcarriers or different sets of subcarriers can be assigned to different targets, and the subcarriers assigned to a target can use different modulations and/or different coding. Also, though not shown in FIG. 8, a target of "user type 1" can be allocated to most or all of the subcarriers, and the assigned subcarriers can use different modulations and/or different coding.) The "user type 2" represents transmission targets for which channel quality information is likely not trustworthy such that coding and interleaving across multiple subcarriers to minimize the impact of frequency selective fading that these transmission targets are likely experiencing is an appropriate option.

The uplink frame 82 includes specifically a feedback channel 86 that the transmission targets use to send their channel quality metrics to the base site. This feedback channel 86 will also accommodate information regarding the likelihood that the channel quality data will be trustworthy. In this embodiment, the feedback channel 86 has been intentionally placed so as not to constitute the temporal conclusion of the frame 82. Instead, a remaining section 87 buffers the feedback channel 86 from the conclusion of the frame 82. This section 87 can be a data payload section if desired. The purpose of this buffering section 87 is to allow sufficient time for the base site, upon receiving and decoding the feedback channel contents, to be able to process the feedback information such that the base site will be able to make appropriate resource allocation decisions and include those corresponding resource allocation instructions in the next transmission opportunity (which in this embodiment comprises the following downlink frame). To serve this purpose, the feedback channel 86 can of course be placed closer to the preceding downlink frame 81 but again, should not be placed so close to the conclusion of the uplink frame 82 as to ensure that the base site will be unable to react as quickly as needed to the information it contains. Depending upon circumstances, this requirement can be important as delay between receiving the feedback channel information and being able to respond with a particular adaptive resource allocation decision can render the feedback channel information stale and the resultant resource allocation decisions inappropriate. Also, depending on the amount of information that has to be carried out on the feedback channel 86, the size of the feedback channel can be variable, and in the extreme case where the user is stationary, could be allocated a single bit. In an additional embodiment where reduced performance is acceptable or where the system environment is such that the channel coherence time is expected to be much larger than a TDD frame duration, the information from the feedback channel in the current TDD frame can be decoded during a following TDD frame and then be used for a subsequent TDD frame.

Figure 9:
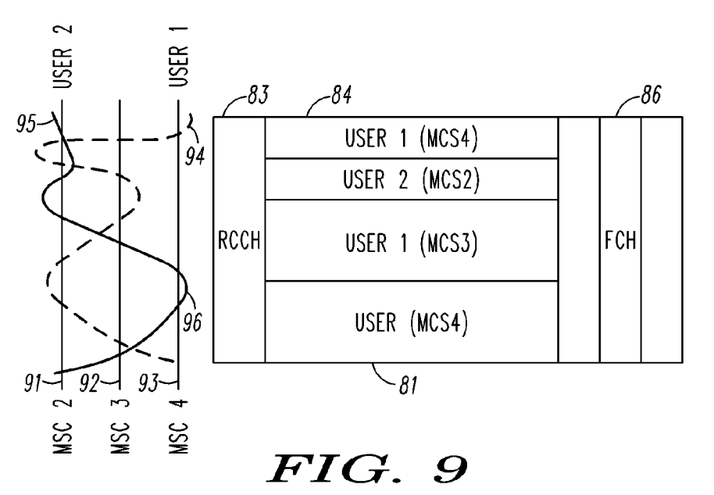
FIG. 9 comprises a block diagram depiction of a downlink and uplink frame as juxtaposed against a representative view of channel quality for two users at various subcarrier frequencies using various modulation and coding schemes.

FIG. 9 again depicts the downlink frame 81 and the uplink frame 82. FIG. 9 also depicts, however, the impact of frequency selective fading upon signal reception 94 and 95 of two users across all frequencies comprising the channel and with respect to three separate modulation and coding schemes 91, 92, and 93. These illustrations are a simple example that demonstrates ways in which the channel quality information can be utilized to effect a high system throughput rate. For example, it can be seen that user 2 is experiencing favorable reception 96 around a particular frequency and conversely that user 1 is experiencing a deep fade around this same frequency. Based upon this channel quality information as provided by both users to the base site, and with an assurance that such data is trustworthy for both users, the base site can assign subcarriers that correspond in frequency to this favorable frequency 96 for user 2. Similarly, other subcarriers are assigned to specific users to promote, to the extent possible, providing useful frequencies to specific users and to avoid providing unuseful frequencies to specific users. Note that over a period of time the frequency selective fading profiles 94 and 95 may change, and the particular subcarriers assigned to the users can be changed accordingly to ensure that useful frequencies continue to be provided to the users.

Figure 10:
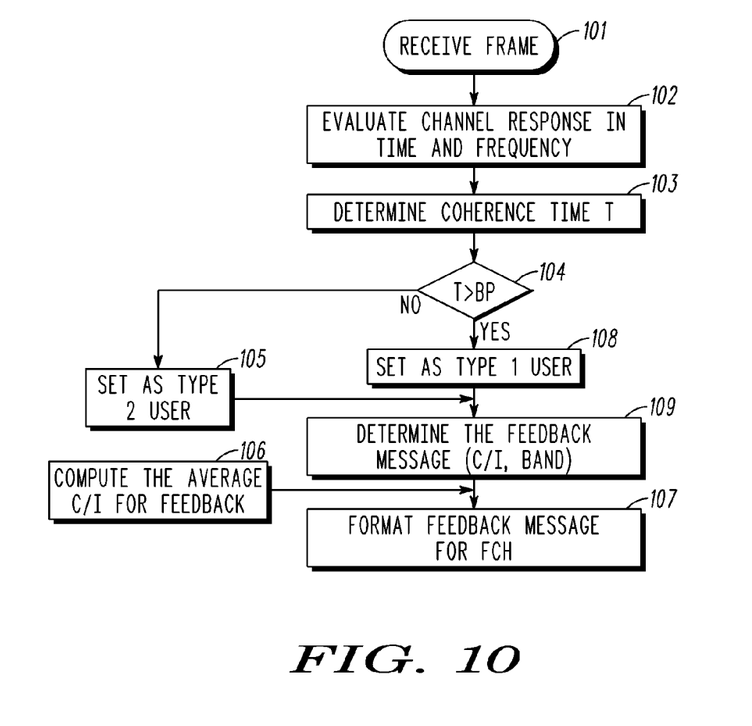
FIG. 10 comprises a flow diagram depicting operation of a mobile communication unit in accordance with an embodiment of the invention.

Referring now to FIG. 10, a specific embodiment for realizing a mobile unit in accordance with the above embodiments will be described. The mobile unit receives 101 a downlink frame as described above and evaluates 102, at least during the fast sounding channel portion, the channel response in time and frequency. To support the processes described above, the mobile also determines 103 coherence time for the channel. As noted earlier, this can be done in a variety of ways, including by direct or indirect measurement of speed, by estimating the Doppler power spectrum, or by comparing the channel frequency response from different times to name a few. In this embodiment, the coherence time is compared 104 against a breakpoint threshold.

When this determination 104 concludes that the coherence time is less than the breakpoint, a conclusion follows that the channel is changing too quickly to allow fast adaptation. In this embodiment, the mobile responds by identifying 105 itself as a "type 2" user. If desired, this identification can be accomplished by a single bit in the feedback channel of the uplink frame described above. Knowing that the base site, upon receiving the type 2 indicator, will determine that channel quality data for this particular mobile will not be temporally trustworthy, the mobile can compute 106, for example, the average C to I ratio across all subcarriers of the channel and provide 107 this information in the feedback channel portion of the uplink frame. (Other channel quality measurements and indicia could of course be used, either in addition to C to I or as an alternative, including but not limited to various signal to noise measurements (such as S/N, S/(I+N), and so forth), bit error rate, and the like.) Such information can be utilized by the base site to better evaluate the diversity exploitation opportunities that may exist.

When the above determination 104 concludes that the coherence time is greater than the breakpoint, a conclusion follows that the channel is not changing too quickly to allow fast adaptation. In this embodiment, the mobile responds by identifying 108 itself as a "type 1" user (which indicator will inform the base site that channel quality data for this particular mobile is likely to be trustworthy). The mobile can then develop 109 channel quality information (such as determining C to I for at least some of the subbands) and this channel quality information along with the type one indicator can then be formatted 107 for placement within the feedback channel of the uplink frame.

So configured, a mobile operating in this mode can readily support compatible operation with the above described processes and with very little system overhead being required.

Figure 11:
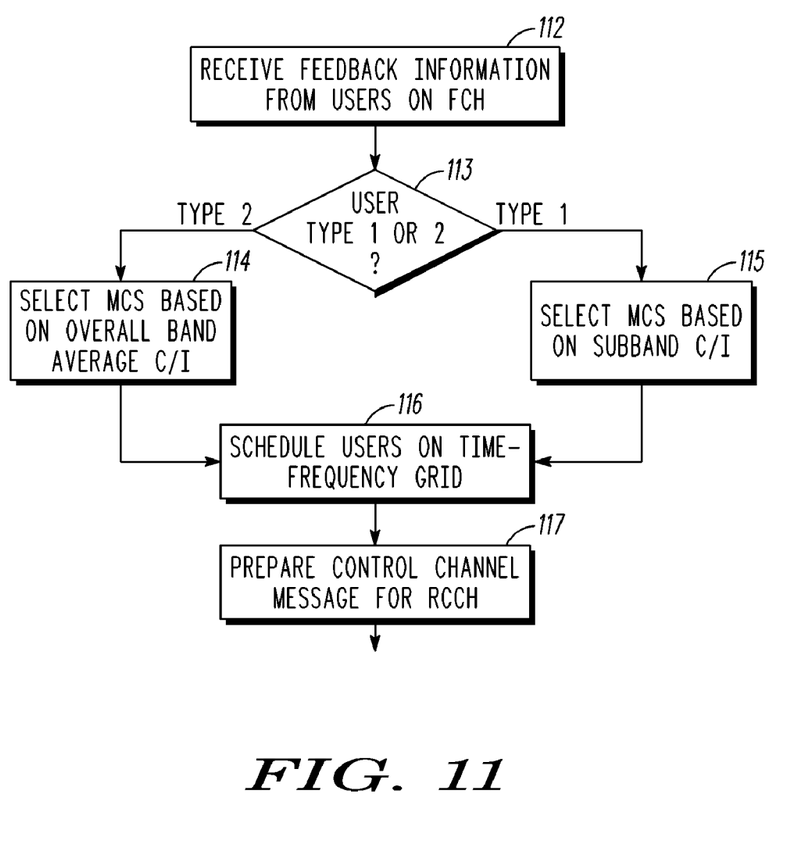
FIG. 11 comprises a flow diagram depicting operation of a transmission source such as a base station in accordance with an embodiment of the invention.

Referring now to FIG. 11, a particular embodiment of a base site that will function compatibly with the mobile just described will be presented. The base site receives 112 feedback information from various mobiles via the feedback channel in the uplink frame. The base site can then determine 113 whether this feedback information for each mobile indicates a type 1 or type 2 user status. If a type 2 status is indicated for a particular mobile (thereby indicating that this particular mobile is likely experiencing a rapidly changing and fading environment), the base site can select a particular modulation and coding scheme based upon the overall band average C to I information as also transmitted by the mobile in the feedback information. In an additional embodiment, the band average C to I information can be averaged across a period of time in order to reflect a longer-term average channel quality (for example, averaging over the Rayleigh fading aspect of the channel). If a type 1 status is indicated for a particular mobile (thereby indicating that this particular mobile is likely not experiencing a rapidly changing and fading environment), the base site can select 115 a particular modulation and coding scheme based upon the individual subband C to I information as provided by the mobile. A subband comprises one or more subcarriers, and a type 1 user can provide subband C to I information for a plurality of subbands. If multiple subbands are assigned to a single user, the subbands assigned to a single user can use different modulation and/or coding.

The base site then schedules 116 the frequencies, times of transmission, and modulation and coding schemes to be used when transmitting data to these mobiles. These instructions are then formatted 117 for placement within the resource allocation control channel of the downlink frame.

Pursuant to these various embodiments, a base site can effectively allocate its channel resources, over time, over its frequencies, and over its users, to support use of modulation and coding schemes that will best support a high level of throughput for both individual users and for the system as a whole. These concepts are readily scalable to accommodate a large number of subcarriers and/or modulation and coding schemes. Importantly, these benefits can be attained without requiring an extravagant dedication of overhead resources to the process.

Those skilled in the art will recognize that a variety of alterations, modifications, and combinations can be made with respect to the various embodiments described above. It should be understood that these various alterations, modifications, and combinations are to be considered as within the spirit and scope of the invention.

We claim:

1. A method for facilitating adaptive transmissions by a base station in a multi-carrier system where a total available bandwidth is split into a set of subbands, each subband of the set of subbands comprising at least one subcarrier, the method comprising:
   providing data to be transmitted to at least one transmission target;
   determining whether likely trustworthy channel quality data is obtainable;
   when likely trustworthy channel quality data is not obtainable, receiving a first channel quality report comprising an overall channel quality indicator, selecting a first set of subcarriers for transmission, and selecting a first modulation and coding scheme for the selected set of subcarriers based on the overall channel quality indicator;
   when likely trustworthy channel quality data is obtainable, receiving a second channel quality report comprising at least one subband channel quality indicator, selecting a second set of subcarriers within at least one subband for transmission based on the at least one subband channel quality indicator, and selecting a second modulation and coding scheme for at least one of the at least one subband selected for transmission based on a corresponding at least one subband channel quality indicator;
   transmitting a resource allocation control channel comprising a selected one of the first modulation and coding scheme and the second modulation and coding scheme, and the selected set of subcarriers; and
   transmitting at least a portion of the data on subcarriers within the resource allocation using the selected one of the first modulation and coding scheme and the second modulation and coding scheme.

2. The method of claim 1 wherein determining whether likely trustworthy channel quality data is obtainable further includes determining whether channel quality data would likely be accurate at a time when used.

3. The method of claim 2 wherein determining whether channel quality data would likely be accurate at a time when used includes determining whether channel quality data would likely be accurate at a time when used for each of a plurality of sub-carriers.

4. The method of claim 1 wherein determining whether likely trustworthy channel quality data is obtainable includes obtaining data that tends to reflect at least a channel coherence time attribute of the transmission target.

5. The method of claim 4 wherein obtaining data that tends to reflect at least a channel coherence time attribute of the transmission target includes obtaining data that tends to reflect at least a channel coherence time attribute of the transmission target comprising at least one of a velocity of the transmission target, a geographic location of the transmission target, Doppler power spectrum estimations, maximum Doppler frequency estimations, time based comparisons of channel frequency response, and a cruise control setting that corresponds to the transmission target.

6. The method of claim 4 wherein obtaining data that tends to reflect at least a channel coherence time attribute of the transmission target includes accessing previously acquired data.

7. The method of claim 5 wherein obtaining data that tends to reflect at least a channel coherence time attribute of the transmission target includes acquiring new data.

8. The method of claim 5 wherein determining whether likely trustworthy channel quality data is obtainable includes obtaining data that tends to reflect a rate of change of channel characteristics as pertains to the transmission target.

9. The method of claim 8 wherein obtaining data that tends to reflect a rate of change of channel characteristics as pertains to the transmission target includes receiving a single bit that comprises the data.

10. The method of claim 8 wherein obtaining data that tends to reflect a rate of change of channel characteristics as pertains to the transmission target includes obtaining data that tends to reflect a rate of change of frequency dimension channel characteristics.

11. The method of claim 8 wherein obtaining data that tends to reflect a rate of change of channel characteristics as pertains to the transmission target includes obtaining data that tends to reflect a rate of change of time dimension channel characteristics.

12. The method of claim 4 wherein obtaining data that tends to reflect at least a channel coherence time attribute of the transmission target includes receiving a transmission from the transmission target that includes information regarding the channel coherence time attribute.

13. The method of claim 1 wherein when the likely trustworthy channel quality data is not obtainable, the selecting the set of subcarriers and the selecting a modulation and coding scheme further comprises determining not to transmit at least a portion of the data.

14. The method of claim 1, wherein the at least one subband channel quality indicator comprises a plurality of subband channel quality indicators.

15. The method of claim 1 wherein the determining whether likely trustworthy channel quality data is obtainable comprises receiving a message from a mobile unit indicating a channel coherence time attribute status of the mobile unit.

16. The method of claim 1 wherein the determining whether likely trustworthy channel quality data is obtainable comprises assessing at least one of an expected average and an maximum speed of the at least one transmission target.

17. The method of claim 1 wherein when likely trustworthy channel quality data is obtainable, receiving a channel quality report comprising one or more subband channel quality indicators comprises receiving a channel quality indicator for a most favorable quality subband.

18. The method of claim 1 wherein the channel quality report is received not proximal to the beginning of a downlink frame boundary in a Time Division Duplex (TDD) system.

19. The method of claim 1 further comprising selecting at least one of a first antenna for transmission according to the first modulation and coding scheme, and a second antenna for transmission according to a second modulation and coding scheme.

20. A method for facilitating adaptive transmissions in a multi-carrier, multi-dimension domain, comprising:
providing data to be transmitted to at least one transmission target;
determining whether likely trustworthy channel quality data is obtainable;
when likely trustworthy channel quality data is not obtainable, selecting a first modulation and coding scheme based upon an overall average channel quality indicator for a plurality of communications signal carriers to use when transmitting at least part of the data to a first given transmission target;
when likely trustworthy channel quality data is obtainable, at least attempting to obtain channel quality data;
when channel quality data is obtained, using at least a channel quality indicator information for at least some individual carriers to select a second modulation and coding scheme to use when transmitting at least part of the data to a second given transmission target, the second modulation and coding scheme being selected from amongst a plurality of candidate modulation and coding schemes.

21. The method of claim 20 wherein selecting a particular modulation and coding scheme from amongst a plurality of candidate modulation and coding schemes includes selecting a particular modulation and coding scheme based at least in part upon individual subband channel quality indicator information for a plurality of subbands.

22. The method of claim 20 wherein selecting the first modulation and coding scheme includes selecting a particular modulation and coding scheme from amongst a plurality of candidate modulation and coding schemes.

23. The method of claim 22 wherein selecting a particular modulation and coding scheme from amongst a plurality of candidate modulation and coding schemes includes selecting a particular modulation and coding scheme based at least in part upon channel quality indicator information as averaged across a plurality of subbands.

24. A method for facilitating adaptive transmissions in a multi-carrier, multi-dimension domain, comprising:
providing data to be transmitted to at least one transmission target;
determining whether likely trustworthy channel quality data is obtainable;
when likely trustworthy channel quality data is not obtainable, determining at least whether, how, and when to transmit at least a portion of the data pursuant to a first transmission selection mode;
when likely trustworthy channel quality data is obtainable, at least attempting to obtain channel quality data;
when channel quality data is obtained, using the channel quality data to determine at least whether, how, and when to transmit at least a portion of the data pursuant to a second transmission selection mode, wherein using the channel quality data to determine whether, how, and when to transmit at least a portion of the data pursuant to a second transmission selection mode includes selecting a first modulation and coding scheme for use with a first carrier and a second modulation and coding scheme for use with a second carrier to transmit at least a portion of the data.

25. The method of claim 24 wherein at least attempting to obtain channel quality data includes:
transmitting a signal to the transmission target; and
receiving a response from the transmission target, which response includes channel quality data.

26. The method of claim 25 wherein transmitting a signal to the transmission target includes transmitting a fast sounding channel evaluation signal such that the transmission target can evaluate a time-frequency response of the multi-carrier domain.

27. The method of claim 26 wherein receiving a response from the transmission target, which response includes channel quality data, includes receiving a response from the transmission target, which response includes individual channel quality indicator information for at least some carriers in the multi-carrier domain.

28. The method of claim 25 wherein receiving a response from the transmission target, which response includes channel quality data further comprises receiving a response from the transmission target, which response includes at least frequency domain channel quality data.

29. A method for facilitating adaptive transmissions in a multi-carrier, multi-dimension domain, comprising:
    providing data to be transmitted to at least one transmission target;
    determining whether likely trustworthy channel quality data is obtainable;
    when likely trustworthy channel quality data is not obtainable, selecting a first modulation and coding scheme based upon an overall average channel quality indicator for a plurality of communications signal carriers to use when transmitting at least part of the data to the at least one transmission target;
    when likely trustworthy channel quality data is obtainable, at least attempting to obtain channel quality data;
    when channel quality data is obtained, using at least a channel quality indicator information for at least some individual carriers to select a second modulation and coding scheme to use when transmitting at least part of the data to the at least one transmission target;
    wherein selecting a first modulation and coding scheme and using at least a channel quality indicator information for at least some individual carriers to select a second modulation and coding scheme transmitting at least a portion of the data to the at least one transmission target within a frame of constant size.

30. The method of claim 29 wherein using the channel quality indicator information to select a second modulation and coding scheme includes using the channel quality indicator information to complete a determination, prior to a next data transmission opportunity, of at least whether, how, and when to transmit at least a portion of the data to be transmitted.

31. The method of claim 29 wherein using the channel quality indicator information to select a second modulation and coding scheme includes using the channel quality indicator information to determine at least whether, how, which transmitter to use, and when to transmit at least a portion of the data pursuant to the second modulation and coding scheme.

32. A method for facilitating adaptive transmissions in a multi-carrier communications system comprising:
    providing a plurality of communications signal carriers and a plurality of modulation and coding schemes;
    providing data to be transmitted to a plurality of transmission targets;
    determining whether likely trustworthy channel quality data is obtainable for the transmission targets by accessing data that tends to reflect a rate of change of channel characteristic as pertains to the transmission targets;
    when likely trustworthy channel quality data is not obtainable for a first given transmission target, selecting a first modulation and coding scheme based upon overall average channel quality indicator for the plurality of communications signal carriers to use when transmitting at least part of the data to the first given transmission target;
    when likely trustworthy channel quality data is obtainable for a second given transmission target, accessing at least channel quality data that includes channel quality indicator information for at least some individual carriers of the multi-carrier communication system;
    using at least the channel quality indicator information for at least some individual carriers to select a second modulation and coding scheme to use when transmitting at least part of the data to the second given transmission target.

33. The method of claim 32 wherein:
    selecting a first modulation and coding scheme based upon overall average channel quality indicator for the plurality of communications signal carriers to use when transmitting at least part of the data to the first given transmission target includes selecting a plurality of the individual carriers, for at least a portion of a next transmission opportunity, to use when transmitting to the first given transmission target; and
    selecting a second modulation and coding scheme to use when transmitting at least part of the data to the second given transmission target includes selecting one of the individual carriers, for at least a portion of a next transmission opportunity, to use when transmitting to the second given transmission target.

34. A method for facilitating adaptive transmissions comprising:
    providing data to be transmitted;
    determining that the data includes first data to be transmitted to a first transmission target and second data to be transmitted to a second transmission target;
    determining whether likely trustworthy channel quality data is obtainable for each transmission target;
    when likely trustworthy channel quality data is not obtainable for a particular transmission target, selecting a first modulation and coding scheme based upon an overall average channel quality indicator for the plurality of communications signal carriers to use when transmitting at least part of the first data to the first transmission target;
    when likely trustworthy channel quality data is obtainable for a given transmission target, at least attempting to obtain the corresponding channel quality data;
    when the channel quality data is obtained, using at least a channel quality indicator information for at least some individual carriers to select a second modulation and coding scheme to use when transmitting at least part of the second data to the second transmission target.

35. The method of claim 34 wherein determining whether likely trustworthy channel quality data is obtainable for each transmission target includes obtaining data that tends to reflect at least a channel coherence time attribute of each of the transmission targets.

36. The method of claim 34 wherein when likely trustworthy channel quality data is obtainable for a given transmission target, at least attempting to obtain the corresponding channel quality data further includes at least attempting to obtain the corresponding channel quality data for each of a plurality of candidate carriers.

37. The method of claim 34 wherein using at least a channel quality indicator information for at least some individual carriers to select a second modulation and coding scheme to use when transmitting at least part of the second data to the second transmission target includes matching transmission targets to candidate carriers, which carriers appear to be better suited to support transmissions to the corresponding matched transmission target.

38. The method of claim 37 wherein matching transmission targets to candidate carriers includes considering matching multiple candidate carriers to a particular transmission target to thereby facilitate use of multiple candidate carriers when transmitting data to the particular transmission target.

39. A method for use by a mobile communications unit that communicates in a multi-carrier system, comprising:
   determining a channel coherence time attribute for a multicarrier communication channel in a multicarrier communication system;
   determining an identification of the mobile communications unit as one of a first type and a second type based on the coherence time attribute;
   transmitting a message indicating the classification made by the mobile communications unit;
   in response to the identification being of the first type, determining a band-average channel quality for an overall bandwidth of a multicarrier communication channel, and transmitting the band-average channel quality; and
   in response to the classification being of the second type, determining a channel quality for at least one subband within the multicarrier communication channel, wherein a subband comprises at least one subcarrier, transmitting the channel quality for the at least one subband, and transmitting a corresponding subband index for the at least one subband.

40. The method of claim 39 wherein determining the channel coherence time attribute for a multi-carrier channel includes directly measuring a speed of movement of the mobile communications unit.

41. The method of claim 39 wherein determining the channel coherence time attribute for a multi-carrier channel includes at least estimating a Doppler power spectrum.

42. The method of claim 39 wherein determining the channel coherence time attribute for a multi-carrier channel includes comparing channel frequency response as determined at differing times.

43. The method of claim 39, wherein
   the determining a channel quality for at least one subband comprises determining a channel quality for each of a plurality of subbands within the multicarrier communication channel;
   the transmitting the channel quality for at least one subband comprises transmitting the channel quality for each of the plurality of subbands; and
   the transmitting a corresponding subband index for at least one subband comprises transmitting a corresponding subband index for each of the plurality of subbands.

44. The method of claim 39 wherein at least one of (a) the identification and channel quality, and (b) the identification and channel quality and subband index, is transmitted in a single message.

45. The method of claim 39 wherein
   the determining a channel quality for at least one subband comprises determining a channel quality for each of a plurality of subbands within the multicarrier communication channel, and identifying a favorable quality subband from amongst the plurality of subbands;
   the transmitting the channel quality for the at least one subband comprises transmitting at least the channel quality for the favorable quality subband; and
   the transmitting a corresponding subband index for at least one subband comprises transmitting a corresponding subband index of at least the favorable quality subband.

46. The method of claim 39 wherein
   the determining a channel quality further comprises determining an integer channel quality indicator corresponding to a modulation and coding scheme index; and
   the transmitting the channel quality comprises transmitting the integer channel quality indicator corresponding to the modulation and coding scheme index as the channel quality.

47. The method of claim 39 wherein the determining the identification of the mobile communications unit as one of a first type and a second type based on the coherence time attribute comprises comparing the coherence time attribute to a breakpoint threshold value to determine the classification of the mobile communications unit.

48. The method of claim 39 wherein a number of subcarriers in the at least one subband is not more than half a number of subcarriers in the multicarrier communication channel.

49. The method of claim 39 wherein a number of subcarriers in the at least one subband is greater than one.

* * * * *